United States Patent [19]
Honma

[11] Patent Number: 5,507,039
[45] Date of Patent: Apr. 9, 1996

[54] MOBILE WIRELESS APPARATUS WITH POWER CONSUMPTION REDUCTION CIRCUITRY

[75] Inventor: Kouichi Honma, Yokohama, Japan

[73] Assignee: Matsushita Electric Industrial Co., Ltd., Osaka, Japan

[21] Appl. No.: 871,694

[22] Filed: Apr. 21, 1992

[30] Foreign Application Priority Data

May 10, 1991 [JP] Japan ........................... 3-105412
May 23, 1991 [JP] Japan ........................... 3-146536

[51] Int. Cl.$^6$ .......................................... H04B 1/40
[52] U.S. Cl. ..................... 455/343; 455/38.3; 455/73; 371/5.1
[58] Field of Search ................... 455/38.3, 73, 89, 455/343; 375/7, 8, 121, 219, 222, 377; 371/14, 5.1, 5.5

[56] References Cited

U.S. PATENT DOCUMENTS 4,506,386  3/1985  Ichikawa et al. ................ 455/343
5,140,698  8/1992  Toko ............................... 455/343

FOREIGN PATENT DOCUMENTS 0103523    5/1988   Japan ........................... 455/343
63-303521  12/1988  Japan ........................... 455/343
0186023    8/1991   Japan ........................... 455/38.3
9119367    12/1991  WIPO .

Primary Examiner—Edward F. Urban
Assistant Examiner—Doris To
Attorney, Agent, or Firm—Stevens, Davis, Miller & Mosher

[57] ABSTRACT

In a mobile wireless apparatus, electric power consumed during standing-by operation is saved by using intermittent reception or the like because electric power is consumed even during standing-by operation. It is therefore an object of the present invention to more greatly reduce electric power consumed during intermittent reception. The mobile wireless apparatus according to the present invention operates to prolong the period of intermittent reception when the electric field intensity detected during intermittent reception is weak to thereby avoid wasteful battery consumption caused by the continuation of the receiving operation when the mobile wireless apparatus is out of its service area.

5 Claims, 3 Drawing Sheets

5,507,039

MOBILE WIRELESS APPARATUS WITH POWER CONSUMPTION REDUCTION CIRCUITRY

BACKGROUND OF THE INVENTION

The present invention relates to a mobile wireless apparatus used in a car telephone, a portable telephone, or the like, and particularly relates to a mobile wireless apparatus in which electric power consumed during standing-by operation can be saved.

FIG. 1 shows the configuration of a conventional mobile communication apparatus.

As shown in FIG. 1, a conventional mobile wireless apparatus has a reception system constituted by a reception circuit 2 for converting a signal received by a reception antenna 1 into a signal of a predetermined frequency and a predetermined amplitude, a demodulation circuit 8 for demodulating the signal converted by the reception circuit 2 to obtain a base-band signal, and a speaker 13 for reproducing the base-band signal obtained by the demodulation circuit 8. The conventional mobile wireless apparatus further has a control system constituted by an error detection and correction circuit 12 for detecting bit errors in the digital signal in the base-band signal obtained by the demodulation circuit 8 and for correcting the bit errors, a sequence control circuit 11 for controlling connection to a base station on the basis of the output signal from the error detection and correction circuit 12, and a timing control circuit 10, connected to the sequence control circuit 11, and for controlling the timing of the whole mobile wireless apparatus. The conventional mobile wireless apparatus further has a transmission system constituted by a modulation circuit 7 which is supplied with a signal obtained by multiplexing an audio signal from a microphone 14 and a signal from the error detection and correction circuit 12, and a transmission circuit 5 for converting the output from the modulation circuit 7 into a signal of a transmission frequency and for transmitting the signal through an antenna 6.

The conventional mobile wireless apparatus further has a synthesizer 4 for selecting a reception frequency and a transmission frequency. The synthesizer 4 is controlled by the timing control circuit 10 and supplies a high-frequency output to both the reception circuit 2 and the transmission circuit 5.

The timing control circuit 10 is connected to the reception circuit 2, the demodulation circuit 8, the sequence control circuit 11, the error detection and correction circuit 12, the synthesizer 4, and the like, in order to perform an intermittent receiving operation and is further connected to points necessary for timing control.

The operation of the conventional mobile wireless apparatus having the aforementioned configuration will be described hereunder.

A reception signal received by the antenna 1 is converted into a signal of a predetermined frequency and a predetermined amplitude in the reception circuit 2 by using the output from the synthesizer 4. The signal of the predetermined frequency and amplitude is fed to the demodulation circuit 8, in which a base-band signal is reproduced and sent out as a voice through the speaker 13.

On the other hand, a digital control signal in the base-band signal reproduced by the demodulation circuit 8 is supplied to the sequence control circuit 11 after error correction in the error detection and correction circuit 12. While controlled by the sequence control circuit 11 and the demodulation circuit 8, a timing control signal during intermittent reception of a predetermined interval and during communication, as shown in FIG. 2, is generated in the timing control circuit 10.

As shown in FIG. 2, during intermittent reception, the timing control circuit 10 intermittently powers on only the reception circuit 2, the demodulation circuit 8, the sequence control circuit 11, the error detection and correction circuit 12 and the synthesizer 4 so as to carry out reception of the control signal.

As shown in FIG. 2, during communication, not only the reception system is operated continuously but a signal obtained by multiplexing an audio signal from the microphone 14 and the digital control signal from the error detection and correction circuit 12 is supplied to the modulation circuit 7 to modulate a carrier wave. After being converted into a signal which has a predetermined frequency and predetermined electric power through the transmission circuit 5 by using the output from the synthesizer, the carrier signal is transmitted through the antenna 6.

Electric power consumed in the period of standing-by can be saved even in the conventional mobile wireless apparatus having the aforementioned configuration because the control signal can be received intermittently as shown in FIG. 2.

The conventional mobile wireless apparatus, however, has a problem in that a battery is wasted because the intermittent reception is repeated even in the case where the wireless apparatus is out of its service area, or even in the case where the electric source is left on in spite of the fact that the wireless apparatus is in an unreceivable place such as a basement of an office building.

SUMMARY OF THE INVENTION

An object of the present invention is to reduce consumption of electric power by widening the interval of intermittent reception when the electric field intensity is weak.

Another object of the present invention is to attain power saving by widening the interval of intermittent reception or cutting off the electric source for a long time through detecting bit error of the control signal, when the mobile wireless apparatus is out of its service area at the time of intermittent reception.

In addressing the foregoing objects, according to an aspect of the present invention, there is provided a mobile wireless apparatus comprising: means for intermittently operating a reception circuit during standing-by operation means for controlling the interval of the intermittent receiving operation; and means for detecting the electric field intensity at the time of intermittent reception, whereby the interval is prolonged when the detected electric field intensity is weak.

According to another aspect of the present invention, there is provided a mobile wireless apparatus comprising: means for intermittently operating a reception circuit during standing-by operation; means for correcting errors of a received signal and for detecting the presence/absence of such a signal that is too weak to be corrected with error; and means for controlling the interval of the intermittent receiving operation in accordance with the presence/absence of the weak signal for error correction, whereby the interval is prolonged when such a weak signal in which errors cannot be corrected is present.

According to the present invention, the received electric field intensity is detected while the reception circuit operates intermittently at the time of standing-by, so that the interval of the intermittent receiving operation is prolonged to reduce consumed electric power when the detected electric field intensity is weak.

Further, according to the present invention, the interval of the intermittent receiving operation can be prolonged to reduce consumed electric power in the case where such a weak signal in which errors cannot be detected in the received signal is present while the reception circuit operates intermittently at the time of standing-by.

DESCRIPTION OF THE PREFERRED EMBODIMENTS

Embodiment 1

Figure 3:
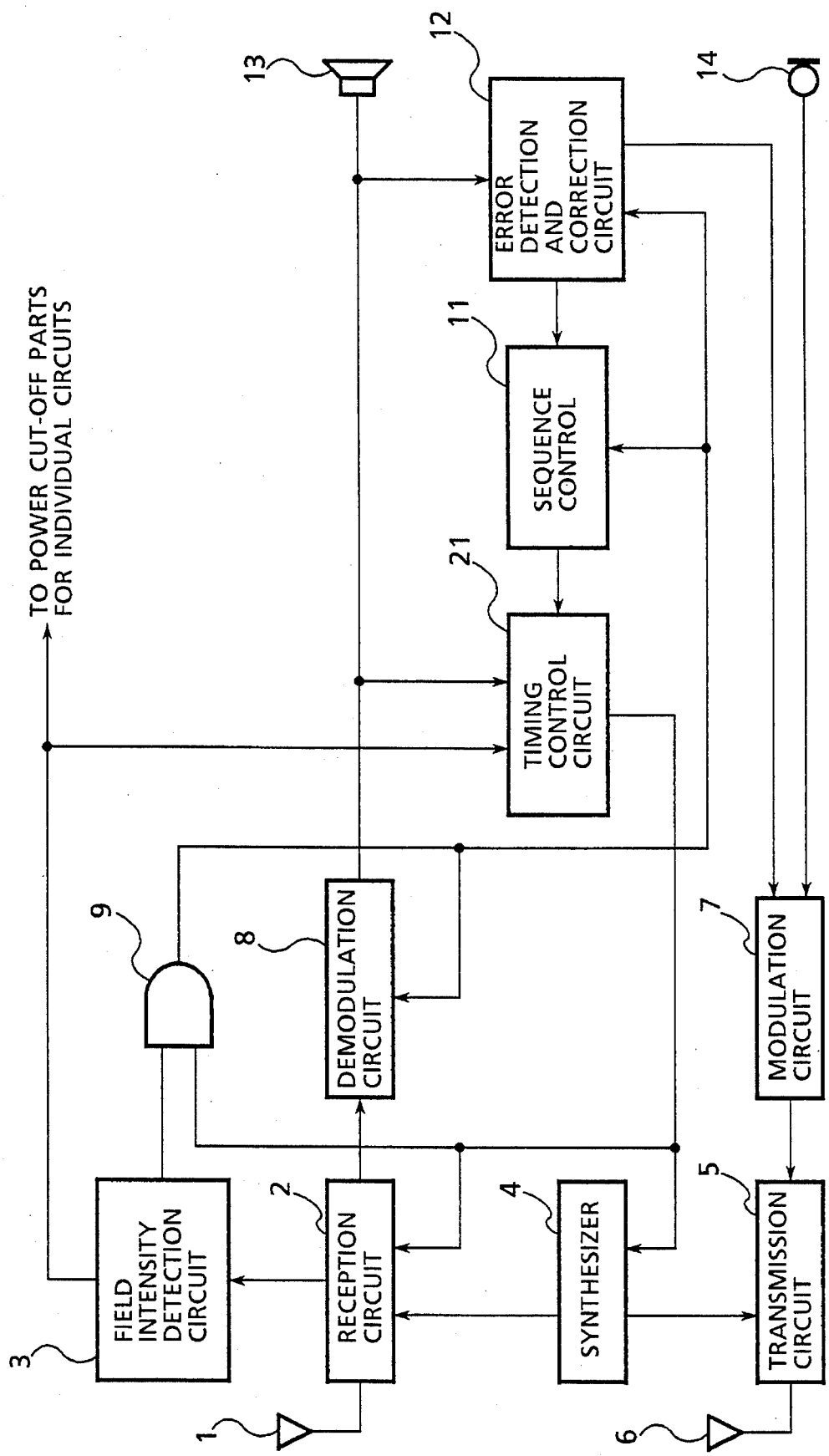
FIG. 3 is a block diagram of a mobile wireless apparatus showing a first embodiment of the present invention.

FIG. 3 is a block diagram of a mobile wireless apparatus showing a first embodiment of the present invention. As shown in FIG. 3, the mobile wireless apparatus in this embodiment has a reception system constituted by a reception circuit 2 for converting a signal received in a reception antenna 1 into a signal of a predetermined frequency and a predetermined amplitude, an electric field intensity detection circuit 3 for detecting the electric field intensity of the signal received by the reception circuit 2, a demodulation circuit 8 for demodulating the signal converted by the reception circuit 2 to obtain a base-band signal, and a speaker 13 for reproducing the base-band audio signal obtained by the demodulation circuit 8. The mobile wireless apparatus further has a control system constituted by an error detection and correction circuit 12 for correcting bit errors in the digital signal in the base-band signal obtained by the demodulation circuit 8, a sequence control circuit 11 for controlling connection to a base station on the basis of the output signal from the error detection and correction circuit 12, and a timing control circuit 21 connected to the sequence control circuit 11 and provided for controlling the timing on the whole of the mobile wireless apparatus. The mobile wireless apparatus further has a transmission system constituted by a modulation circuit 7 supplied with a signal obtained by multiplexing an audio signal from a microphone 14 and a signal from the error detection and correction circuit 12, and a transmission circuit 5 for converting the output from the modulation circuit 7 into a signal of a transmission frequency and for transmitting the signal through an antenna 6.

The mobile wireless apparatus further has a synthesizer 4 for selecting a reception frequency and a transmission frequency. The synthesizer 4 is controlled by the timing control circuit 21 so as to supply a high-frequency output to both the reception circuit 2 and the transmission circuit 5.

The mobile wireless apparatus further has an AND circuit 9 for obtaining a logical product of the detection output from the electric field intensity detection circuit 3 and the output from the timing control circuit 21. The output from the AND circuit 9 is supplied to the demodulation circuit 8, the sequence control circuit 11 and the error detection and correction circuit 12.

The operation of the mobile wireless apparatus having the aforementioned configuration in this embodiment will be described hereunder.

A reception signal received by the antenna 1 is converted into a signal of a predetermined frequency and a predetermined amplitude in the reception circuit 2 by using the output from the synthesizer 4. The signal having the predetermined frequency and amplitude is supplied to the demodulation circuit 8, in which a base-band signal is reproduced and sent out as a voice through the speaker 13.

On the other hand, a digital control signal reproduced by the demodulation circuit 8 is supplied to the sequence control circuit 11 after errors are corrected by the error detection and correction circuit 12. Under the control of the sequence control circuit 11 and the demodulation circuit 8, a timing control signal during intermittent reception of a predetermined interval and during communication, as shown in FIG. 2, is generated in the timing control circuit 21.

Figure 1:
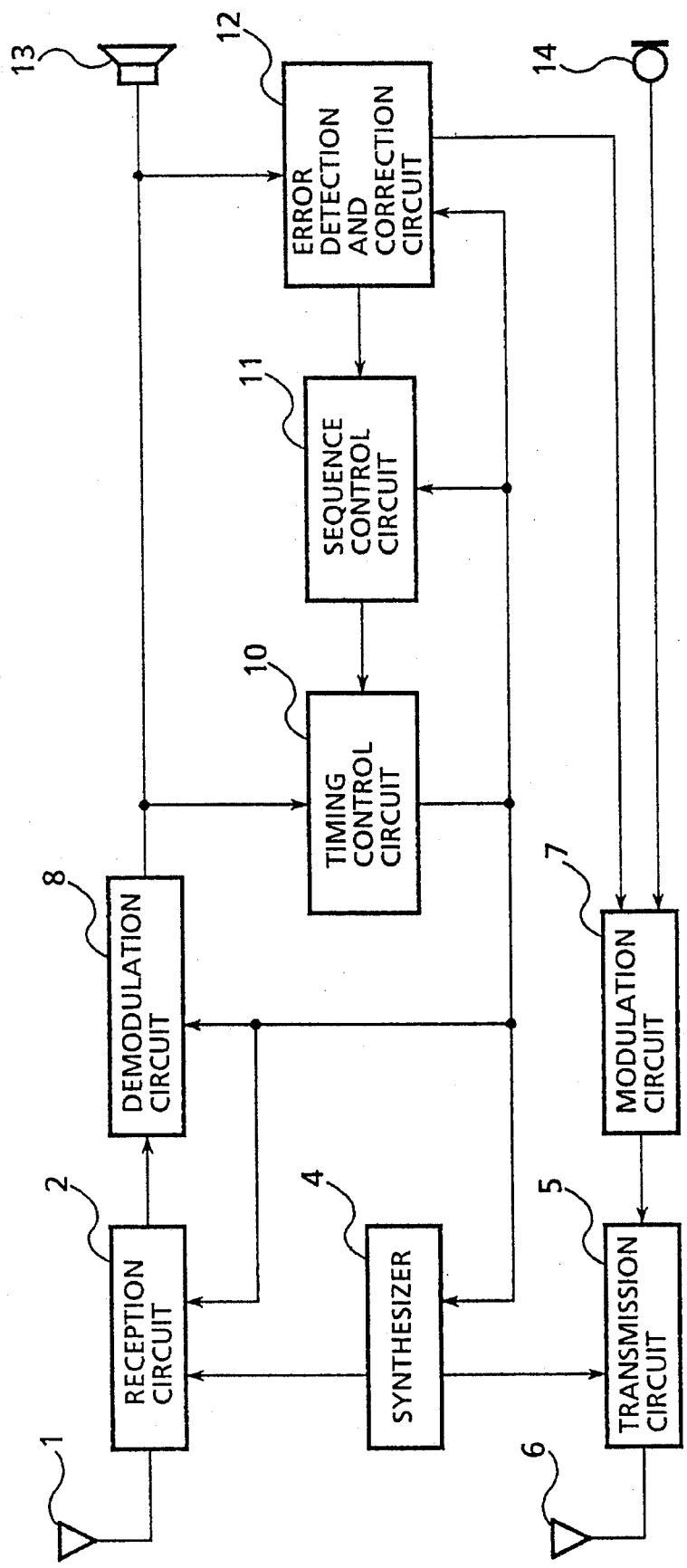
FIG. 1 is a block diagram showing the configuration of a conventional mobile communication apparatus.
Figure 2:
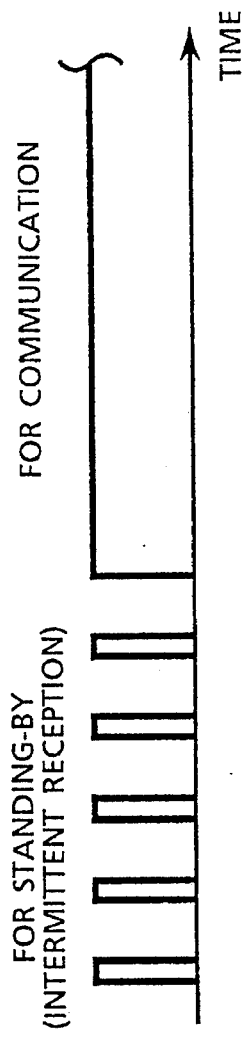
FIG. 2 is a timing chart for explaining the intermittent receiving operation in a mobile communication apparatus.

During intermittent reception shown in FIG. 2, the timing control circuit 21 directly intermittently turns on the electric source for the reception circuit 2 and the synthesizer 4 and further indirectly intermittently turns on the electric source for the demodulation circuit 8, the sequence control circuit 11 and the error detection and correction circuit 12 through the AND circuit 9 to thereby perform reception of the control signal.

In the electric field intensity detection circuit 3, the electric field intensity during intermittent reception is detected on the basis of the output signal from the reception circuit 2. Two kinds of detection signals, that is, (1) a signal instantaneously detected during intermittent reception and (2) a signal continuously detected, are considered now. The following four procedures are carried out on the basis of the two kinds of signals.

(1) When the electric field intensity detection circuit 3 detects that the electric field intensity during intermittent reception continues to be weak over a predetermined period, the detection signal is supplied to the timing control circuit 21 so as to enlarge the interval of the intermittent receiving operation.

(2) When the electric field intensity during intermittent reception becomes weak instantaneously, respective electric sources for the error detection and correction circuit 12, the sequence control circuit 11 and the demodulation circuit 8 are cut off during intermittent reception.

(3) The operation of (1) and the operation of (2) are carried out simultaneously.

(4) When the electric field intensity during intermittent reception continues to be weak, all electric sources are once cut off so that the mobile wireless apparatus is restarted by turning on an electric source switch without any one of the procedures (1) to (3).

In this embodiment, the following excellent effects are shown by the aforementioned operations:

(1) Because the interval of intermittent reception is prolonged when the electric field intensity detection circuit detects that the electric field intensity during intermittent reception continues to be weak, consumed electric power can be reduced;

(2) Because the respective electric sources for the error detection and correction circuit 12, the sequence control circuit 11 and the demodulation circuit 8 are cut off during intermittent reception when the electric field intensity becomes instantaneously weak at the time of intermittent reception, consumed electric power can be reduced more greatly; and (3) Because all the electric sources are cut off so that the mobile wireless apparatus is restarted by turning on the electric source switch when the electric field intensity during intermittent reception is continuously weak, wasteful battery consumption can be prevented in the case where the mobile wireless apparatus is left out of its service area or in the case where the electric source therefor is left on; and so on.

Embodiment 2

Figure 4:
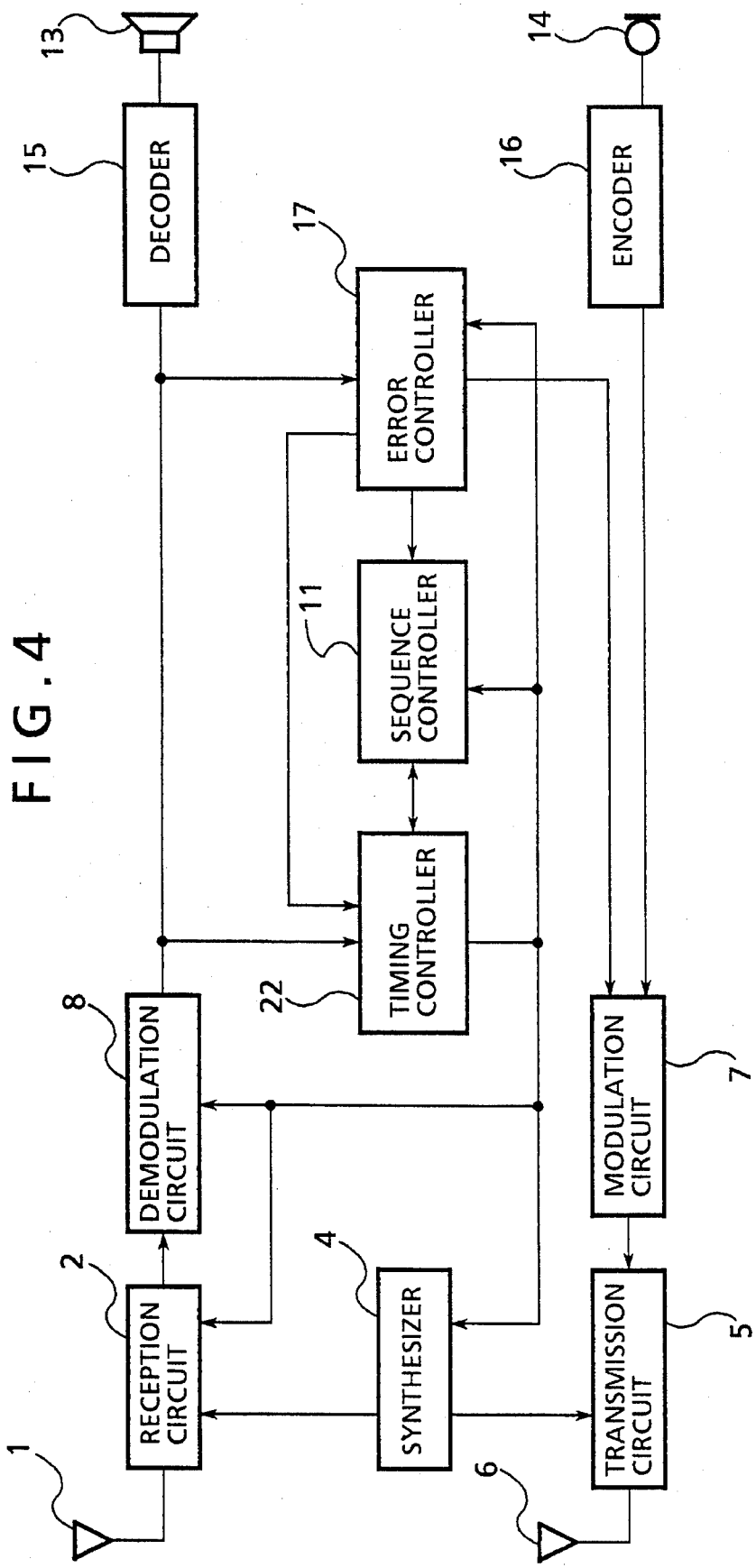
FIG. 4 is a block diagram of a mobile wireless apparatus showing a second embodiment of the present invention.

FIG. 4 is a block diagram showing the configuration of a second embodiment of the present invention. In FIG. 4, the reference numerals 1, 2, 4 to 8, and 11, 13 and 14 designate parts the same as or equivalent to those in the first embodiment. The reference numeral 15 designates a decoder, connected to the demodulation circuit 8, and for reproducing a signal from the demodulation circuit 8 as a voice, and 16 designates an encoder, connected to the microphone 14, for encoding an electric signal from the microphone 14 into a compressed digital signal. The reference numeral 17 designates an error controller, connected to the demodulation circuit 8, and having a double function of correcting errors in response to a part of the digital output to thereby generate an error correction signal and detecting that such slight error which cannot be corrected is continuously produced for a predetermined period. In this embodiment, a general error detection code (CRC: cyclic redundancy check code) is used for detecting the fact that errors cannot be corrected. The reference numeral 22 designates a timing controller for controlling the timing on the whole of the mobile wireless apparatus on the basis of the output from the sequence controller 11 and the output from the error controller 17.

Figure 5:
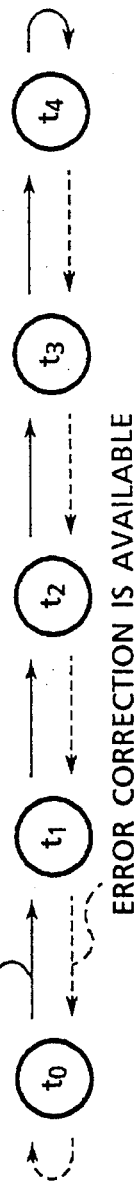
FIG. 5 is an explanatory diagram showing the change of the interval of intermittent reception in the second embodiment of the present invention.

The operation of the mobile wireless apparatus in this embodiment during standing-by operation will be described hereunder. Errors are corrected by the error controller 17. When there is any data in which an error cannot be corrected, a first signal for reporting the incorrectable error is supplied to the timing controller 22 to enlarge the interval for generating a timing signal determining the operation timing on the whole of the mobile wireless apparatus, that is, to enlarge the intermittent reception interval. As shown in FIG. 5, the intermittent reception interval is changed from the ordinary interval $t_0$ to a longer interval $t_1$ by the timing controller 22 when the present interval is $t_0$ and an error cannot be corrected. In the case where errors still cannot be corrected, the intermittent reception interval is successively prolonged to $t_2$, $t_3$ and $t_4$. In FIG. 5, the respective intervals have the relations: $t_0<t_1<t_2<t_3<t_4$. In the case where the error can be corrected, a second signal for reporting correctable error is supplied to the timing controller 22 to shorten the intermittent reception interval in the order of $t_4 \rightarrow t_3 \rightarrow t_2 \rightarrow t_1 \rightarrow t_0 \rightarrow$. In the case where the present intermittent reception interval is $t_0$ and error cannot be corrected, or in the case where the present intermittent reception interval is $t_0$ and error can be corrected, the intermittent reception interval is kept as $t_4$ or $t_0$.

As another error controlling method, the intermittent reception interval may be shortened without feeding of the second signal when the can be corrected.

Although this embodiment has shown the case where the intermittent reception interval is prolonged soon after detecting that error cannot be corrected, the present invention can be applied to the case where the intermittent reception interval may be prolonged after the number of times in reception of the first signal from the error controller 17 into the timing controller 22 reaches a predetermined number or to the case where the intermittent reception interval may be prolonged by the timing controller 22 through the first signal after the error incorrectable state has continued for a predetermined number of times in the error controller 17.

Accordingly, in this embodiment, when such errors that cannot be corrected by the error controller 17 continue for a predetermined period, the mobile wireless apparatus is regarded as being out of its service area and the intermittent reception interval is enlarged to thereby more greatly reduce consumed electric power compared with electric power consumed at the time of normal intermittent reception.

When such errors that cannot be corrected by the error controller 17 continues for a predetermined period, the electric source for the whole of the mobile wireless apparatus may be cut off so that the operation thereof can be restarted by turning on the electric source again. In this case, consumed electric power can be reduced more greatly.

What is claimed is:

1. A mobile wireless apparatus, comprising:

(a) a reception portion for demodulating an original coded digital signal from a received signal and for reproducing an audio signal from the demodulated digital signal;

(b) a transmission portion for converting an analog audio signal into a compressed digital signal and for transmitting the compressed digital signal;

(c) an error controller for detecting and correcting correctable errors in the demodulated digital signal in response to a part of the demodulated digital signal and for detecting presence or absence of uncorrectable errors in the demodulated digital signal that cannot be corrected and generating an output indicating said presence or absence of said uncorrectable errors;

(d) a sequence controller for performing line connection to a base station on the basis of the output from said error controller and generating an output; and (e) a timing controller for controlling operating timing of the mobile wireless apparatus on the basis of the output from said sequence controller and the demodulated digital signal from said reception portion, whereby an intermittent reception interval generated by said timing controller is changed in accordance with the presence or absence of an uncorrectable error in said demodulated digital signal that cannot be corrected by said error controller, wherein:

said timing controller performs timing control to enlarge the intermittent reception interval when said uncorrectable errors that cannot be corrected in said error controller are continuously detected for a predetermined time during intermittent reception operation.

2. A mobile wireless apparatus, comprising:

(a) a reception portion for demodulating an original coded digital signal from a received signal and for reproducing an audio signal from the demodulated digital signal;

(b) a transmission portion for converting an analog audio signal into a compressed digital signal and for transmitting the compressed digital signal;

(c) an error controller for detecting and correcting correctable errors in the demodulated digital signal in response to a part of the demodulated digital signal and for detecting presence or absence of uncorrectable errors in the demodulated digital signal that cannot be corrected and generating an output indicating said presence or absence of said uncorrectable errors;

(d) a sequence controller for performing line connection to a base station on the basis of the output from said error controller and generating an output; and (e) a timing controller for controlling operating timing of the mobile wireless apparatus on the basis of the output from said sequence controller and the demodulated digital signal from said reception portion, whereby an intermittent reception interval generated by said timing controller is changed in accordance with the presence or absence of an uncorrectable error in said demodulated digital signal that cannot be corrected by said error controller, wherein:

said timing controller performs timing control to cut off an electric power source for the whole mobile wireless apparatus when said uncorrectable errors that cannot be corrected in said error controller are continuously detected for a predetermined time during intermittent reception operation.

3. A mobile wireless apparatus comprising:

(a) an antenna for receiving an input signal;

(b) a synthesizer for providing a synthesizing signal;

(c) a reception circuit for converting, responsive to said synthesizing signal, a signal output by said antenna to a signal having a predetermined frequency and a predetermined amplitude;

(d) a detection circuit for detecting an electric field intensity of the input signal received by said antenna;

(e) a demodulation circuit for demodulating the signal output by said reception circuit to obtain a base-band signal;

(f) an error detection and correction circuit for correcting bit errors in digital control signals in the baseband signal;

(g) a sequence control circuit for controlling connection to a base station; and (h) a timing control circuit, connected with said sequence control circuit, for controlling timings of the mobile wireless apparatus as a whole, wherein:

said mobile wireless apparatus cuts off power from a power source to said demodulation circuit, said error detection and correction circuit and said sequence control circuit when the detection circuit detects that said electric field intensity is below a reference value at an instant of intermittent reception.

4. A mobile wireless apparatus according to claim 3, wherein said timing control circuit cuts off power from said power source to said demodulation circuit, said error detection and correction circuit and said sequence control circuit through an AND circuit that receives a first input from said detection circuit and a second input from said timing control circuit and provides an output to said demodulation circuit, said sequence control circuit and said error detection and correction circuit.

5. A mobile wireless apparatus comprising:

(a) an antenna for receiving an input signal;

(b) a synthesizer for providing a synthesizing signal;

(c) a reception circuit for converting, responsive to said synthesizing signal, a signal output by said antenna to a signal having a predetermined frequency and a predetermined amplitude;

(d) a detection circuit for detecting an electric field intensity of the input signal received by said antenna;

(e) a demodulation circuit for demodulating the signal output by said reception circuit to obtain a base-band signal;

(f) an error detection and correction circuit for correcting bit errors in digital control signals in the baseband signal;

sequence control circuit for controlling connection to a base station; and (h) a timing control circuit, connected with said sequence control circuit, for controlling timings of the mobile wireless apparatus as a whole, wherein:

said mobile wireless apparatus cuts off all power to said mobile wireless apparatus when the detection circuit detects that said electric field intensity during intermittent reception continues below a reference value for a predetermined time interval, and said mobile wireless apparatus includes a power switch to restart ON operation of said mobile wireless apparatus, and said timing control circuit (i) cuts off power from a power source to said demodulation circuit, said error detection and correction circuit and said sequence control circuit through an AND circuit that receives a first input from said detection circuit and a second input from said timing control circuit and provides an output to said demodulation circuit, said sequence control circuit and said error detection and correction circuit and (ii) directly cuts off power from said power source to said reception circuit and said synthesizer.

\* \* \* \* \*